3,269,095
METHOD OF REMOVING CHLORINE COMPOUNDS FROM GASES OBTAINED BY COMBUSTION OF WASTE LIQUORS
Rolf Brännland, Ornskoldsvik, Sweden, assignor to Mo Och Domsjo AB, Ornskoldsvik, Sweden, a corporation of Sweden
No Drawing. Filed Nov. 26, 1963, Ser. No. 326,262
Claims priority, application Sweden, Dec. 5, 1962, 13,130/62
4 Claims. (Cl. 55—71)

The present invention relates to a method of reducing the accumulation of chlorides in chemical recovery processes based on the combustion of waste liquors resulting from the pulping of cellulosic materials by the sulfite or sulfate pulping methods.

A disadvantage of a closed chemical recovery system is that an accumulation of undesirable substances easily occurs. With regard to corrosion problems, chlorides are the most objectionable substances. As long as the recovery processes are directed only to the base used in the pulping, the accumulation of chlorides is low, because a considerable portion of the amount of chlorides supplied e.g. with fresh water or wood is exhausted with the combustion gas from the combustion of the concentrated waste liquor.

Thus, e.g., in a sulfite pulp mill, operating on sodium base, it was observed that 40% to 60% of the amount of chloride supplied to the combustion furnace left with the combustion gases as hydrogen chloride.

However, if it is desired to expand the chemical recovery system to include also the sulfur dioxide in the combustion gases by introducing a combustion gas scrubber, the concentration of chlorides in the system will tend to reach values which may be up to 10 times higher than the values achieved without chemical recovery, due to the fact that chlorides will be taken up from the combustion gases in the scrubber and thus returned to the system.

Therefore, it is desirable to remove the hydrogen chloride from the combustion gas in a separate preliminary step, before the absorption of sulfur dioxide starts. In conventional combustion gas scrubbers one operates as a rule at gas velocities of between 1 and 2 meters per second and liquid loadings of above 0.5 liter per cubic meter of gas (normal conditions) to achieve a sufficient degree of wetting in the gas.

"Degree of wetting" refers to the portion of the gas which contacts the washing liquid. Thus, e.g., 100% degree of wetting means that no superheated gas passes the first washing step of a combustion gas scrubber.

A conventional washing system would involve great difficulties for washing out chlorides, because with the great amounts of water involved it would be necessary to recirculate the washing liquid in order to keep the absorption of sulfur dioxide at a sufficiently low level. This would involve high requirements for corrosion resistance in pumps, pipes, nozzles etc.

Another problem has to do with the tendency of hydrogen chloride to form with water fine droplets of hydrochloric acid, aerosols, which are difficult to absorb in washing liquids of various types. Therefore, a conventional combustion gas scrubber will give a very low degree of absorption in the first chloride separating step, and a major portion of the chlorides will be absorbed in the following alkaline sulfur dioxide absorption step.

Surprisingly, it has been found, however, that it is possible to remove the hydrogen chloride from the combustion gas before recovery of sulfur dioxide, using a small volume of washing liquid and thus a low level of absorption of sulfur dioxide, by supplying the water to a washing section having a higher gas velocity than the conventional, preferably 10 to 20 meters per second. The supply of water can then be reduced to 0.05 to 0.2 liter per cubic meter of saturated gas (normal conditions) without the degree of wetting being lower than in a conventional combustion gas scrubber.

The temperature of the water may vary within wide limits, since the temperature of the gas after washing is only slightly influenced by the temperature of the injected water. In all cases, the gas achieves after washing a temperature close to its original dew point. Therefore, a suitable temperature of the water is from about 0° C. to about 90° C. In particular, however, it has been found suitable to supply the water at a relatively low temperature, preferably from 0° C. to about 20° C. and as fine droplets. Thereby, the superheated gas which normally has a temperature of 100 to 400° C. is cooled, and by the resulting condensation of water vapor, the size of the hydrogen chloride droplets is increased, so that the separation possibilities are considerably improved. When supplying water at a low temperature, the washed gas obtains a temperature slightly below the dew point of the original gas mixture. The greater the amount of water and the lower its temperature, the lower the gas temperature will be. In practice it has been found possible to lower the temperature of the washed gas to 0.2 to 2.0° C. below the dew point of the original gas mixture.

The droplet size at which the water is injected, is also of importance for the efficiency of the chloride absorption process. If the droplets used are too large, the contact surface between the gas and the liquid will be too low and the chloride absorption will be low. If the droplets used are too small the degree of absorption will be higher, but the resulting mist will be difficult to separate and will accompany the washed gas to the following washing step, absorbed in the washing liquid used therein and cause corrosion. A suitably average droplet size is 0.1 to 0.5 millimeter. A preferred droplet size is 0.15 to 0.30 millimeter.

A suitable droplet size is obtained by a suitable selection of injection nozzles and by controlling the pressure of the water supplied thereto.

Separation of the hydrochloric acid containing washing liquid can take place in a spray condenser of conventional type.

The addition of water for the removal of chlorides can take place, e.g., in a gas conduit leading to the combustion gas scrubber, wherein for economical reasons the gas velocity is often selected between 10 and 20 meters per second. If other gas velocities in the gas conduit leading to the scrubber are used, it is suitable to provide, by a change of its cross-section (constriction or expansion) a gas velocity of between 10 and 20 meters per second in the combustion gas conduit adjacent to the scrubber. Experiments have shown that the best possible degree of wetting of the gas is achieved by using so-called plan nozzles, which deliver a flat, horizontal spray, and which are disposed in slots adjacent the gas conduit and which introduce the water in a plane at right angles to the direction of flow of the gas. Another suitable method is also to use so-called full cone nozzles which are placed in the gas flow so that the water is introduced substantially opposite to the direction of flow of the gas. With these positions of the nozzles, a satisfactory degree of wetting will be obtained, and at the same time the nozzles will be protected from contact with the superheated corrosive flue gas. If it is preferred to carry out the removal of chlorides from the combustion gases in the same tower as used for the continued washing of the combustion gases it is possible to provide this tower with constriction means such that the desired gas velocity of 10 to 20 meters per second is obtained, whereupon the washed gas is allowed to expand to the lower gas velocity suitable for the following absorption steps.

The invention is illustrated, but not limited by the following example, wherein gas percentages are by volume.

*Example*

A combustion gas from combustion of sodium sulfite waste liquor had the composition 63.4% of nitrogen, 21.4% of water, 11.0% of carbon dioxide, 3.9% of oxygen, 0.3% of sulfur dioxide and 0.003% of hydrogen chloride. Its temperature was 125° C. prior to the treatment in the combustion gas scrubber. If this gas were saturated with water of 5° C. temperature, the gas mixture would have a dew point of 64.4° C.

By so-called plan nozzles disposed in slots adjacent the horizontal gas conduit, washing water was introduced substantially horizontally and at right angles to the direction of gas flow. By varying the nozzle size and operating pressure, the addition of water and the droplet size were varied, while the gas velocity was maintained at 15 meters per second.

TABLE 1

| Water supplied in liter per cubic meter gas (normal conditions) | Average droplet size, mm. | Separated Chloride in percent of chloride content of unwashed gas | $SO_2$ loss in percent of supplied $SO_2$ |
|---|---|---|---|
| 0.03 | 0.2 | 40 | 1.7 |
| 0.05 | 0.2 | 60 | 2.8 |
| 0.10 | 0.2 | 75 | 6.2 |
| 0.10 | 0.4 | 60 | 6.2 |

The dew point of the gas mixture was lowered by an addition of 0.1 liter of water of +5° C. temperature per cubic meter of gas (normal conditions) to 63.5° C., i.e. 0.9° C. below the dew point of the saturated gas.

In a conventionally carried out chloride washing at a gas velocity of 1.5 meters per second and a liquid loading of 0.5 liter per cubic meter of gas (normal conditions), one obtains with the above gas mixture a loss of 38% $SO_2$, based on the amount of $SO_2$ supplied, due to absorption in the washing water. The loss can be reduced by recycling the washing water, but in that case serious corrosion problems will occur.

The term "water-soluble chlorine compounds" is used in the claims to encompass chlorides, that is chlorine containing salts, and hydrochloric acid.

I claim:

1. A method of removing water-soluble chlorine compounds from gases obtained by combustion of waste liquors from the pulping of cellulosic materials by the sulfite or sulfate pulping methods, which comprises contacting superheated gases resulting from said combustion at a temperature within the rang from about 100 to about 400° C., and at a velocity within the range from about 10 to about 20 meters per second with cold water at a temperature within the range from about 0 to about 20° C., and at an average droplet size within the range from about 0.1 to about 0.5 mm. in an amount sufficiently in excess of the amount required to saturate the gas to lower the temperature of the gas to about 0.2 to about 2° C. below the dew point of the gas saturated with water vapor.

2. A method as in claim 1, in which the excess of water is 0.05 to 0.2 liter per cubic meter of gas at atmospheric conditions.

3. A method as in claim 1, in which the cold water is introduced in the form of a flat spray in a direction substantially in a plane at right angles to the direction of gas flow.

4. A method as in claim 1, in which the cold water is introduced in the form of a full cone spray, in a direction countercurrently to the gas flow.

References Cited by the Examiner

UNITED STATES PATENTS

| 1,821,064 | 9/1931 | Skogmark et al. | 55—73 |
| 2,207,774 | 7/1940 | Barthelemy | 55—89 X |
| 2,221,066 | 11/1940 | Kahle | 55—73 |
| 2,252,536 | 8/1941 | Wiley | 55—71 |
| 2,598,116 | 5/1952 | Dubois | 55—73 |

FOREIGN PATENTS 67,867  5/1944  Norway.

REUBEN FRIEDMAN, *Primary Examiner.*

J. ADEE, *Assistant Examiner.*